July 24, 1951

T. I. TAYLOR 2,562,153

VACUUM DISTILLATION

Filed Aug. 31, 1948

Inventor
THOMAS I. TAYLOR

By Roland A. Anderson

Attorney

July 24, 1951 T. I. TAYLOR 2,562,153
VACUUM DISTILLATION
Filed Aug. 31, 1948 3 Sheets-Sheet 2

Inventor
THOMAS I. TAYLOR
By Roland A. Anderson
Attorney

July 24, 1951 — T. I. TAYLOR — 2,562,153
VACUUM DISTILLATION
Filed Aug. 31, 1948 — 3 Sheets-Sheet 3

Inventor
THOMAS I. TAYLOR
By Roland A. Anderson
Attorney

Patented July 24, 1951

2,562,153

UNITED STATES PATENT OFFICE 2,562,153

VACUUM DISTILLATION

Thomas I. Taylor, New York, N. Y., assignor to the United States of America as represented by the United States Atomic Energy Commission Application August 31, 1948, Serial No. 47,047

10 Claims. (Cl. 202—52)

This invention relates to an apparatus and a process for separating the components of mixtures of liquids by high vacuum or molecular distillation.

Many mixtures of liquid compounds are virtually impossible to separate by distillation at ordinary pressures, primarily because of the fact that the compounds decompose at temperatures far below the temperatures at which they have an appreciable vapor pressure. When such compounds are to be separated by distillation, the process must be carried out at temperatures which are low relative to the boiling point of the mixture. For this reason such a mixture must be distilled at reduced pressure, quite often at an extremely low pressure. That is to say, for a low-temperature distillation of a high-boiling liquid mixture of heat-decomposable compounds, the pressure must be reduced to a value where the vapor pressure of the compounds is appreciable with respect to the ambient pressure.

Another problem in the separation of a liquid mixture by distillation arises where the volatilities of the compounds to be separated are little different from each other at temperatures near the boiling point of the mixture. For example, in a liquid compound containing the isotopic species of an element, the separation of the isotopic species by distillation of the compound is an extremely difficult process. However, by carrying out the distillation process at a relatively low temperature the differences in the volatilities of the compounds in the mixture is magnified. This again requires the use of very low ambient pressures. A process of this type is described in the co-pending application of A. K. Brewer and S. L. Madorsky, Serial Number 478,844, filed March 11, 1943, now Patent No. 2,446,997, granted August 17, 1948. This process provides for the molecular distillation of a liquid mixture containing the isotopic species of an element. The method employs an action similar to countercurrent flow of distilland and condensate. As described, the distilland is flowed downwardly through a series of evaporation zones wherein the liquid is heated and the vapor passes directly to a condensing surface. The condensing surface is inclined so that the condensate is discharged by gravity to evaporation zones upstream with respect to those from which their condensate is derived.

It has been found that as the distillation proceeds the concentration of the more volatile molecules in the surface layer of the liquid being vaporized becomes less, and the rate of volatilization of the more volatile and less volatile molecules becomes more nearly the same.

It is an object of the present invention to provide an improved apparatus for high vacuum or molecular distillation.

It is another object to provide an apparatus capable of giving improved fractionation in high vacuum or molecular distillations in which apparatus structure is provided to supply the more volatile component of the mixture being fractionated to the surface layer of the liquid being distilled.

It is another object of the invention to provide an apparatus for high vacuum or molecular fractional distillation wherein there is a very small holdup of material.

It is an additional object to provide a new method for high vacuum or molecular distillation wherein the distilland flows filmwise over an evaporating surface, and the more volatile component of the mixture is positively supplied to the surface portion of the distilland.

In accordance with the instant invention applicant has devised a novel high vacuum or molecular distillation apparatus comprising a vaporizing surface, a feed device to flow a film of liquid down the surface, a condensing surface disposed adjacent the vaporizing surface, and a device to throw or spray condensate towards the vaporizing surface. This condensate throwing or spraying device may be a series of successively higher surfaces disposed to receive condensate, and extending outwardly and upwardly towards the vaporizing surface. When the surface is rotated during the operation of the apparatus, condensate is forced centrifugally outwardly and upwardly along each of the surfaces and is thrown outwardly and upwardly towards the vaporizing surface to a level higher than the average from which the material of the condensate had vaporized.

In operation of the apparatus according to the present invention, the distilland flows down the vaporizing surface and the components of the distilland vaporize in a relative concentration determined by their relative volatility at the pressure in the distilling column and by their concentration in the mixture being distilled.

The vapors enriched in the more volatile component are condensed on the condensing surface substantially without change in composition and are carried up the upwardly inclined surface by centrifugal force and interfacial tension and thrown against the film of liquid on the vaporizing surface at a point upstream from that at which the original vapors had volatilized. This returned condensate which is enriched in the more volatile component, mixes with the liquid in the film to maintain or increase the concentration of more volatile material in the surface layers of the film. Thus the film at the upstream point is maintained in or brought to condition to evolve vapors still richer in the more volatile component than vapors evolved at a lower point. These still richer vapors pass to the condensing surface and are condensed thereon. The condensate is carried upward and outward, and is thrown against the film of liquid on the vaporizing surface at a point still further upstream than the point of return of the first formed condensate. This procedure is repeated at each of the successively higher inclined surfaces and gives an enrichment at each repetition. The progressive enrichment upward constitutes a movement or flow of more volatile material upwards countercurrent to the downward general flow of liquid.

In some cases, it is preferable in a distilling column of this type that the distance between the condensing surfaces and the vaporizing surface be of the order of the mean free path of the molecules of vapor. This tends to prevent undesirable mixing of the vapor molecules and mass transfer of the vapor upward through the column. The actual distance employed will depend to a large extent upon the pressure in the column and upon the temperature of the distilling surface as well as upon the properties of the distilled liquids.

The invention will be more fully understood in connection with the accompanying drawings representing a number of the embodiments of the invention.

Figures 1, 2:
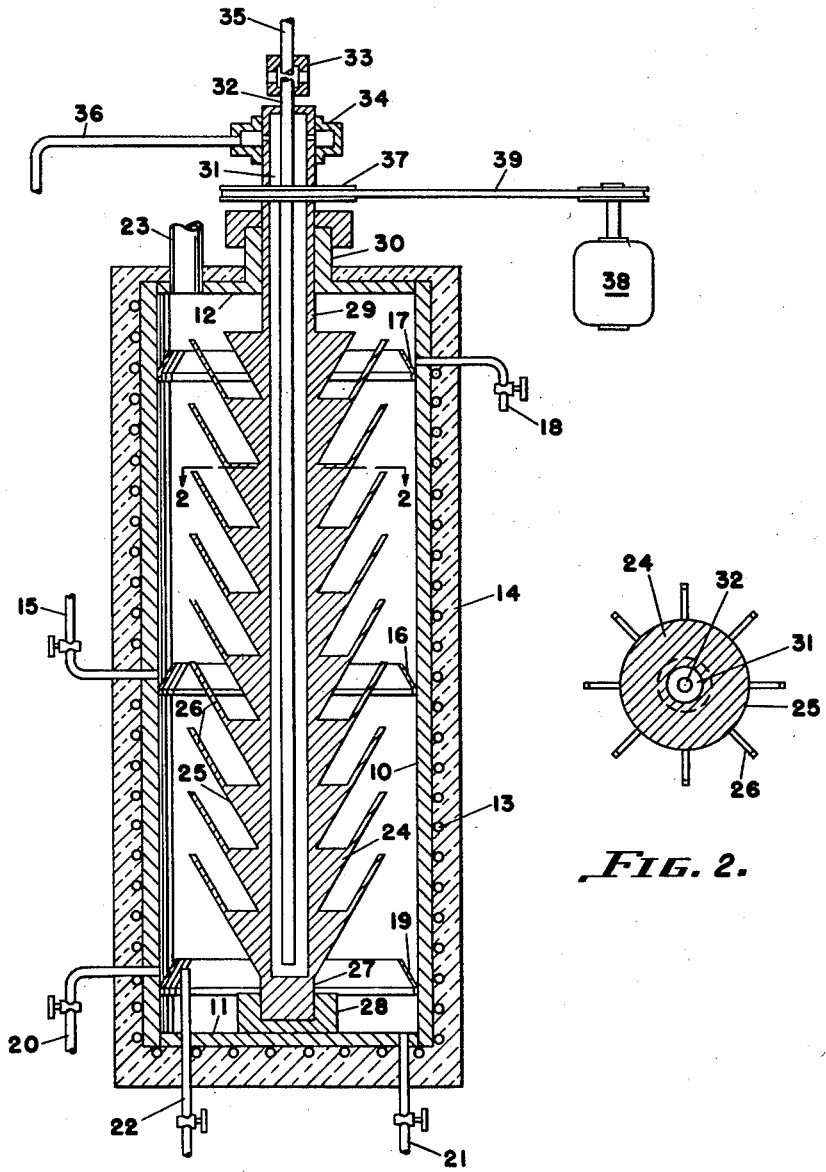
Figure 1 is a vertical section of one form of apparatus according to the invention.
Figure 2 is a horizontal section taken on the line 2—2 of Figure 1, of the condensing and condensate distributing member of the apparatus of Figure 1.

The still shown in Figure 1 comprises a cylindrical shell portion 10 and end portions 11 and 12 cooperating therewith to define an enclosed column. Heating coils 13 are disposed around the sides of the shell portion 10 and beneath the lower end portion 11, and insulation 14 is disposed around the shell portion 10 and end portions 11 and 12.

A valved feed conduit 15 for introducing distilland in use of the apparatus for continuous distillation, is disposed approximately midway of the shell portion 10. A circular trough 16 extends around the interior of the shell 10 in position to receive distilland from the feed conduit 15.

A second trough 17 extends around the interior of the shell near the top of the column to receive more volatile material reaching the top of the column and to discharge it through a valved discharge conduit 18.

A third trough 19 extends around the interior of the shell somewhat above the bottom to receive the less volatile component of the liquid mixture and to discharge it through a valved discharge conduit 20.

For use of the apparatus in batch operation, there is provided a valved feed conduit 21 leading into the bottom of the column and a level-determining valved conduit 22 disposed with its opening spaced above the bottom of the column a distance corresponding to the level of distilland which it is desired to introduce into the column for conducting a batch distillation.

A conduit 23 extending through the upper end portion 12 of the column is connected to a vacuum pump (not shown) for maintaining a suitably high vacuum within the still column.

A condensing and distributing member 24 (see Figures 1 and 2) which has been found satisfactory comprises a series of inverted conical frustum sections 25 concentric with the shell portion 10, with prong members 26 extending upwardly and outwardly from the largest portions of the sections 25. The angle between the conical surfaces and/or prongs and the vertical may be as little as 20° and in general should be great enough to allow the condensate to adhere to the surfaces while being forced upward and outward by centrifugal force. The steepness of the surface which may be used depends upon the diameter, the speed of rotation, and the interfacial tension between the liquid being distilled and the rotating surface. At the base of the condensing and distributing member 24 there is provided a cylindrical portion 27 which rests in a bearing 28 supported on the lower end portion 11 of the column. A second cylindrical portion 29 at the upper end of the condensing and distributing member 24 extends through a vacuum tight bearing member 30 in the upper end portion 12 of the column. A passage 31 is formed in the upper cylindrical portion 29 and down through condensing and distributing member 24 for the introduction of a cooling medium. Suitably this cooling medium may be water and may be led into the passage 31 through the conduit 32 extending to a point near the bottom of the member 24 so that the cooling water flows upwardly through the annular space between the conduit 32 and the walls of the passage 31. Water tight rotatable connections, 33 and 34 are supplied between the water inlet 35 and the conduit 32, and between the end of the passage 31 and a water outlet conduit 36.

The upper cylindrical portion 29 is provided with a pulley member 37 whereby the cylindrical portion 29, and the condensing and distributing member 24 may be rotated by a suitable power source, illustrated as a motor 38 and connecting belt 39.

Figure 4:
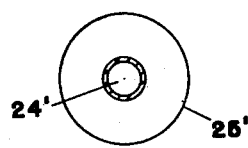
Figures 3 and 4 are respectively a vertical view partially broken away and a horizontal section of a modified condensing and distributing member.
Figure 3:
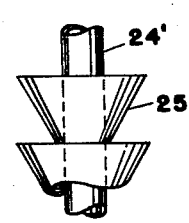

A number of modifications of the condensing surface may be made. The condensing and distributing member 24' illustrated in Figures 3 and 4 is a simple series of inverted frusto-conical sections 25' without upwardly extending prongs. With this form of condenser, however, the liquid is not transported as far up the column at each stage as in the form where prongs are disposed at the edges of the conical sections.

Figure 6:
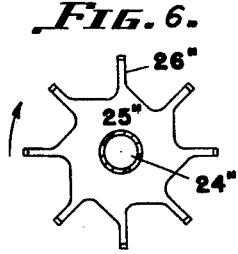
Figures 5 and 6 are respectively a vertical view partially broken away and a horizontal section of a third form of the condensing and distributing member.
Figure 5:
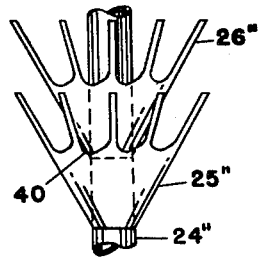

The condensing and distributing member 24" shown in Figures 5 and 6 is similar to that shown in Figures 1 and 2, but portions of the conical surface 25" are cut away, the edge 40 between adjacent prongs 26" sloping more towards the trailing prongs when the direction of rotation is as indicated in Figure 6.

Figure 8:
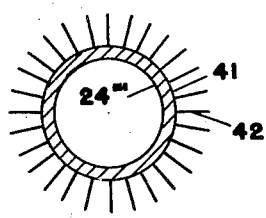
Figures 7 and 8 are respectively a vertical view partially broken away and a horizontal section of a fourth form of the condensing and distributing member.
Figure 7:
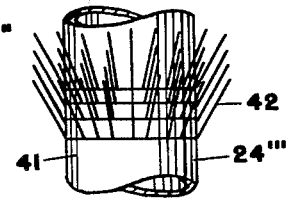

Figures 7 and 8 illustrate a condensing and distributing member 24''' wherein the condensing surface 41 is substantially cylindrical and upwards transport of condensate is effected only by the action of the prongs 42.

Figure 9:
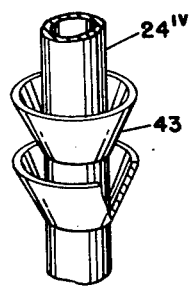
Figures 9, 10, 11 and 12 are perspective views partly broken away of other forms of condensing and distributing devices.
Figure 10:
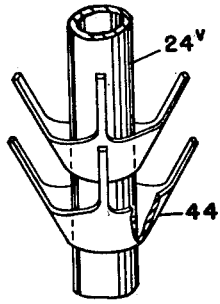

Figures 9 and 10 illustrate condensing and distributing members 24$^{iv}$ and 24$^v$ similar to those shown in Figures 3 and 5 but wherein the surfaces which extend upward and outward are constructed from sheet metal, tubing, or pipe by stamping, spinning or other process.

Figure 11:
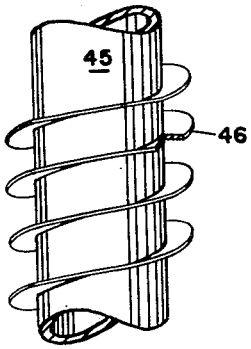

The condensing and distributing member shown in Figure 11 comprises a cylindrical condensing surface 45, and a helically wound strip 46 attached to the cylindrical portion.

Figure 12:
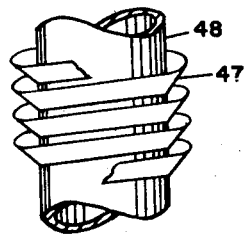

Figure 12 shows a similar condensing and distributing member wherein a helical strip 47 is secured to a cylindrical portion 48 and the strip is bent upward at the edges to provide the desired upward movement of the condensate.

If desired the upward transport of condensate may be made more effective by attaching small prongs which extend outward and upward to the edges of the bent helical fins.

Figures 13, 14:
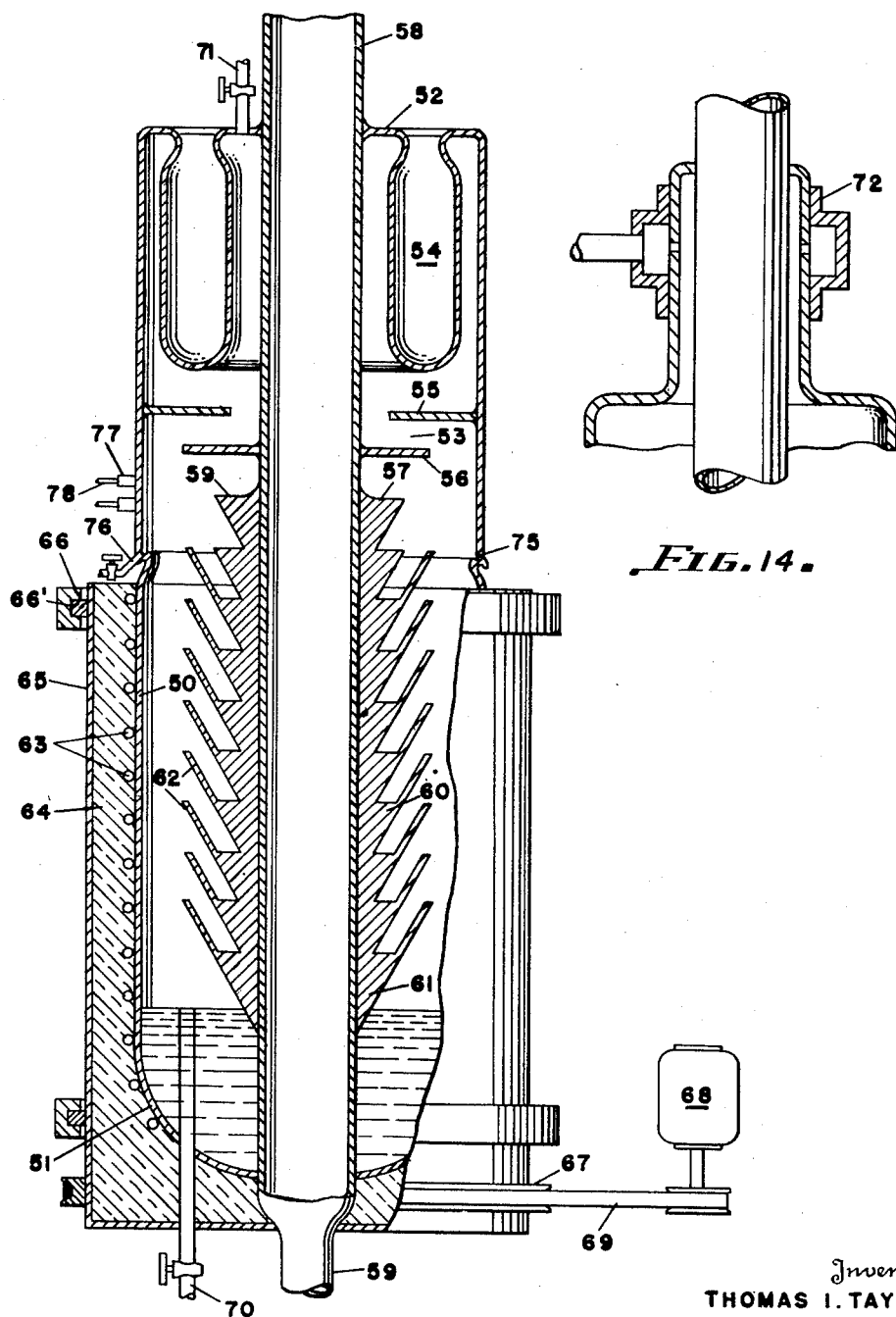
Figure 13 is a vertical sectional view of a modified form of high vacuum or molecular fractionating still.
Figure 14 is a detail view in section of a portion of a further modified form of still.

Figure 13 shows a molecular or high vacuum still according to the present invention wherein the entire column is rotated rather than the condenser member only. This still comprises substantially cylindrical shell member 50 closed by lower and upper end members 51 and 52. As shown in Figure 13, a cold trap 53, inset in end member 52, comprises an annular chamber 54 into which may be placed a suitable cooling medium, e. g., liquid air, an annular baffle 55 extending inwardly from the shell member near the bottom of the chamber 54 and a second annular baffle member 56 mounted on a condenser member 57. A trough 75 extends around the interior of the shell 50 at a level somewhat below the baffle 56 to receive more volatile material from the condenser member 57. A valved discharge conduit 76 is provided for withdrawing material from the trough 75. The condenser member 57 comprises conduit portions 58 and 59 sealed to upper end 52 and the lower end 51 of the column, and a central portion 60 comprising a series of inverted frusto-conical surface sections 61. Prongs 62 extend outwardly and upwardly from the edges of the conical sections 61. The conduit portions 58 and 59 of the condenser member 57 projecting outside of the shell are secured as by rotatable connections (not shown) to a water supply and water discharge conduits (not shown).

A heating coil 63 is disposed around the lower portion of the shell to supply heat for vaporizing liquid flowing down the walls, and insulation 64 is disposed around the shell and coil. Electricity is supplied to the heating coil by slip rings 77 extending around the shell 50 and brushes 78. Insulation 64 is retained within a cylindrical member 65 and bearing surfaces 66 formed around the exterior surface thereof. Suitable cooperating bearing surfaces 66' are provided to cooperate with bearing surfaces 66 to permit rotation of the still assembly. A pulley 67 may extend around the member 65 and a motor 68 and belt 69 may be disposed to rotate the pulley and still assembly.

According to a modification illustrated in Figure 14, the cold trap may be eliminated, and a vacuum tight bearing 72 disposed around the upper end of the shell so that the system may be evacuated continuously while the column is being rotated.

In operation the distilling column, as shown in Figures 1 and 2, is initially evacuated to a desired pressure depending on the vapor-pressure characteristics of the liquids to be distilled. This pressure may be suitably of the order of $10^{-2}$ millimeters of mercury. Coolant is supplied through the conduit 32 to the interior of the passage 31 in the condensing and distributing member. The coolant is selected to maintain a desired condensing temperature. The shell portion 10 and the lower end portion of the column may be heated to a desired temperature by means of the heating coils 13.

The mixture of liquids to be separated is then introduced through the feed conduit 15 to the feed trough 16 on the interior of the shell 10. The feed material overflows the trough 16 and flows in a film down the interior of the shell portion. The heated surface of the shell portion 10 causes a portion of the liquid to vaporize. With the condensing surface at a distance of the order of the mean free path of the vapor from the vaporizing surface (at the pressure in the distilling column), vapor is condensed on the inverted conical surface directly confronting the surface from which the vapor is distilled.

The speed of rotation of the conical condensing surfaces should be sufficient to cause the liquid condensed thereon to travel upwardly and outwardly along the surface of the cones 25. A speed of rotation of the order of 800 to 1600 R. P. M. has been found satisfactory. However, the speed actually used will depend to a large extent on the properties of the condensate and on the column construction. At least a portion of the condensate also travels up the prongs 26 around the edges of the conical sections 25. In any case the liquid leaving the conical section 25 and the prongs 26 is thrown out against the heated shell portion to strike the surface of the shell upstream of the surface from which the condensate was originally evaporated. Indeed, a portion of the condensate may be thrown as high as the top edge of the next higher conical section.

After the column has been in operation for a sufficient period of time, all of the evaporating and condensing surfaces become covered with a film of liquid. The liquid thrown from the rotating surfaces is mixed with the liquid flowing down the wall. This mixture in turn is partially vaporized as it flows down the heated surfaces and the vapors pass substantially directly across to the cooled conical surface at that level. This condensate is again carried upward by the action of centrifugal force and interfacial tension. It will be observed that the relatively volatile component travels upward through the column in what may be considered a stepwise manner while the less volatile component travels progressively downward. Thus, there is provided a sort of countercurrent flow.

The distilled product, richer in the relatively volatile component is obtained from the trough 17 where the more volatile liquid is thrown by the uppermost conical sections. The entire product entering the trough 17 may be withdrawn or a portion of this product may be allowed to flow back to provide the equivalent of reflux. The relatively less volatile material flows toward the bottom of the column and is collected in the trough 19 from which it may be withdrawn through the discharge conduit 20.

A particular column whose condenser shell was 70 millimeters in diameter was provided with a condensing and distributing member 24 as described with reference to Figures 1 and 2. In this column the smallest diameter of the conical sections was 25 millimeters and they inclined upwardly at an angle of 30° to the vertical. The conical surfaces were approximately 10 millimeters from one end to the other. Upwardly and outwardly extending prongs approximately 7 millimeters in length were disposed at spaced intervals about the upper edges of the conical sections.

The column just described was used to separate uranium pentaethylate from uranium hexaethylate, the latter being present in a relatively small concentration. The column was operated with the pressure therein of the order of $10^{-2}$ millimeters of mercury, the condensing and distributing member at a temperature of 20 to 30° C. and the shell portion 10 heated to a temperature of about 110 to 120° C. Substantially complete separation was obtained between the two above-named compounds in a relatively short period of time, the uranium hexaethylate being the relatively more volatile compound.

The fractionating still may be constructed of any suitable material. The surface of the condenser should be such that it is wetted by the liquid and is substantially inactive towards the liquid. The surface of metals may be treated by enameling, spraying, dipping or electroplating with suitable materials to produce a surface substantially inactive towards the liquid. It is desirable that materials employed for the condensing surface be good conductors of heat.

The outer heated surface may be constructed of any suitable material such as metals, glass, or ceramics which are inactive toward the liquid at the temperature of distillation. Metals such as aluminum, tin and lead which tend to form ethylates, or iron which rusts readily, should be avoided for the molecular distillation of the uranium ethylates. The evaporator surface may be left smooth or it may be modified to cause different flow characteristics of the material down the walls. For example, the evaporator surface may be grooved; fitted with spiral wires; roughened; knurled; etched; sanded; enameled and then heated to the softening point of the enamel while it is covered with sand or ground glass or if the outer wall is glass, ground glass may be fused into it.

To operate under primarily molecular distillation conditions, the temperature of the distilland is preferably maintained at values which normally give vapor pressures of the order of $10^{-1}$ to $10^{-3}$ mm. of mercury and the temperature of the condenser should be such as to give normally a vapor pressure less than $10^{-4}$ mm. of mercury. The temperatures chosen will depend to a large extent upon the thermal stability of the material.

When the column is operated as a high-vacuum fractionating column where at least partial equilibrium conditions exist between the vapor and the liquid, the temperature of the evaporator may be such that the vapor pressure is normally from $10^{-3}$ up to several millimeters of mercury or more, depending upon the thermal stability of the materials. The temperature of the condenser can be maintained from the same temperature to 20° to 30° below that of the evaporator.

Alternatively, the column may be operated under conditions of partial condensation by maintaining the temperature of the condenser a few degrees, e. g., 10° below that of the evaporator.

The rate of rotation of the condenser should be great enough to cause the condensed liquid to flow up the surfaces and then to be thrown outward to the evaporator. It has been found that for condensers 1 inch to 2 inches in diameter with 60° conical sections each ½ to 2 inches long, rates of rotation from 800 to 1600 R. P. M. are satisfactory with the higher rates being preferred. Of course, the rate of rotation can be reduced as the diameter of the condenser becomes greater so as to give centrifugal forces of the same order of magnitude. Also the rate of rotation required will be somewhat affected by the length and the angle of the sloping surface. If the angle to the vertical is too small for the rate of rotation used, the liquid will be thrown off the surface before it reaches the top edge. By employing surfaces with relatively greater angles to the vertical the speed of rotation may be increased to high values which may be an advantage in certain cases.

The rotary, high-vacuum or molecular fractionating column described here may be employed for separations other than that already described. It may be used, for example, in the purification of, or separation of components from, certain other metallo-organic compounds; vegetable or mineral oils; waxes; fatty or other acids; hydrocarbons and their derivatives; esters; alcohols; vitamins; medicinal or pharmaceutical products, etc., as is commonly done in molecular distillation or high vacuum practice. It is particularly useful in the distillation of liquids containing or consisting of the isotopic species of an element. Thus, for example, the separation of uranium-235 from uranium-238 may be accomplished by a molecular distillation of uranium pentaethylate through the use of the method and apparatus herein described.

Since many embodiments might be made of the present invention and since many changes might be made in the embodiment described, it is to be understood that the foregoing description is to be interpreted as illustrative only and not in a limiting sense.

I claim:

1. High vacuum distillation apparatus comprising in combination a substantially vertical vaporizing surface, means to supply liquid to be distilled to said surface, means for heating said surface, a condensing surface, means for cooling said condensing surface and means for throwing condensate directly from the condensing surface upwardly and towards the evaporating surface.

2. High vacuum distillation apparatus comprising in combination a substatially vertical vaporizing surface, means for forming a film of liquid to be distilled on said surface, means for heating said surface, a condensing surface, means for cooling the condensing surface, means for maintaining a low pressure between said vaporizing surface and said condensing surface and centrifugal means for throwing condensate directly from the condensing surface upwardly and towards the vaporizing surface.

3. Molecular distillation apparatus comprising in combination a substantially vertical vaporizing surface, means for forming a film of liquid to be distilled on said surface, means for heating said surface, a condensing surface, means for cooling said condensing surface, means for maintaining a low pressure between said vaporizing surface and said condensing surface, and centrifugal means for throwing condensate directly from the condensing surface upwardly and towards the vaporizing surface, said vaporizing surface and said condensing surface being spaced a distance of the order of the mean free path of the molecules under the conditions of distillation.

4. High vacuum distillation apparatus comprising a substantially vertically disposed vaporizing surface, means for forming a film of distilland on said surface, means for heating said surface, a rotatable condensing surface, surface portions rotatable with said condensing surface and extending upwardly and outwardly away from its axis of rotation, means for cooling said condensing surface, and means for rotating the condensing surface and surface portions to throw condensate upwardly and towards said vaporizing surface.

5. Molecular distillation apparatus comprising a vaporizing surface of circular cross section, with its axis substantially vertical, means for forming a film of distilland on said surface, means for heating said surface, a rotatable condensing surface co-axial with said vaporizing surface, said surface extending upwardly and outwardly from its axis, means for cooling said condensing surface, means for rotating the condensing surface to throw condensate upwardly and towards said vaporizing surface by the resultant of centrifugal force and interfacial tension, and means for maintaining a low pressure between said vaporizing surface and said condensing surface, said surfaces being spaced a distance of the order of the mean free path of the molecules under the conditions of distillation.

6. Molecular distillation apparatus as defined in claim 5 wherein upwardly and outwardly extending projections are disposed at the outer edges of said condensing surface.

7. High vacuum distillation apparatus comprising a cylindrical shell disposed with its axis substantially vertical, means for forming a film of liquid to be distilled on the interior surface of said shell, means for heating said shell, a condensing surface co-axial with said shell, surface portions disposed to receive condensate, said surface portions extending outwardly and upwardly towards the vaporizing surface on the interior of said shell, means for rotating said shell, condensing surface and surface portions to throw condensate upwardly and towards said vaporizing surface by the resultant of centrifugal force and interfacial tension, means for cooling said condensing surface and means for reducing the pressure in said shell.

8. Molecular distillation apparatus comprising a cylindrical shell disposed with its axis substantially vertical, means for forming a film of liquid to be distilled on the interior surface of said shell, means for heating said shell to effect evaporation of liquid in contact therewith, a condensing surface co-axial with said shell, said condensing surface extending outwardly and upwardly towards the vaporizing surface on the interior of said shell, means for rotating said shell and condensing surface to throw condensate upwardly and towards said vaporizing surface by the resultant of centrifugal force and interfacial tension, means for cooling said condensing surface and means for reducing the pressure in said shell, the condensing surface and the vaporizing surface of said shell being spaced a distance of the order of the mean free path of the molecules under the conditions of distillation.

9. Molecular distillation apparatus as defined in claim 8 wherein upwardly and outwardly extending projections are disposed at the outer edges of said condensing surface.

10. A fractional distillation apparatus, comprising a vertical tubular member having a uniform cross section, condensing means centrally positioned within said tubular member and distributed over the major portion of the length of said tubular member, means within said tubular member for moving condensate from said condensing means in a direction having a component radially and upwardly to the inner surface of said tubular member, at a plurality of axially spaced positions, and for distributing it on said inner surface, and means for heating said tubular member to a temperature sufficient to at least partially re-evaporate said condensate.

THOMAS I. TAYLOR.

REFERENCES CITED

The following references are of record in the file of this patent:

UNITED STATES PATENTS

| Number | Name | Date |
| --- | --- | --- |
| 2,313,546 | Hickman | Mar. 9, 1943 |